United States Patent
Han et al.

(10) Patent No.: US 9,028,290 B2
(45) Date of Patent: May 12, 2015

(54) METHOD OF PRODUCING POLYMER DISPERSED LIQUID CRYSTAL DEVICE USING COOLING PLATE

(71) Applicant: Dongguk University Industry-Academic Cooperation Foundation, Jung-gu, Seoul (KR)

(72) Inventors: Jeong-In Han, Seoul (KR); Jaeyong Kim, Incheon (KR)

(73) Assignee: Dongguk University Industry-Academic Cooperation Foundation, Seoul (KR)

( * ) Notice: Subject to any disclaimer, the term of this patent is extended or adjusted under 35 U.S.C. 154(b) by 37 days.

(21) Appl. No.: 13/896,410

(22) Filed: May 17, 2013

(65) Prior Publication Data

US 2014/0065917 A1    Mar. 6, 2014

(30) Foreign Application Priority Data

Aug. 29, 2012  (KR) .................. 10-2012-0094969

(51) Int. Cl.
| | | |
|---|---|---|
| H01J 9/24 | (2006.01) | |
| G02F 1/1339 | (2006.01) | |
| G02F 1/1334 | (2006.01) | |
| G02F 1/1341 | (2006.01) | |

(52) U.S. Cl.
CPC ............ *G02F 1/1339* (2013.01); *G02F 1/1334* (2013.01); *G02F 1/1341* (2013.01)

(58) Field of Classification Search
CPC ...... C09K 19/544; C09K 19/52; C09K 19/54; G02F 1/132; G02F 1/13378; G02F 1/1334; G02F 1/13392; G02F 1/13394; G02F 1/1341

USPC ............ 445/23–25; 349/86, 88, 92, 155, 156, 349/190
See application file for complete search history.

(56) References Cited

U.S. PATENT DOCUMENTS

| | | | |
|---|---|---|---|
| 5,426,526 A | * 6/1995 | Yamamoto et al. | 349/42 |
| 2002/0196401 A1 | * 12/2002 | Grace et al. | 349/158 |
| 2004/0012752 A1 | * 1/2004 | Freeman | 349/156 |
| 2006/0215077 A1 | * 9/2006 | Majumdar et al. | 349/88 |

(Continued)

FOREIGN PATENT DOCUMENTS

| | | |
|---|---|---|
| JP | 2008-530618 A | 8/2008 |
| KR | 100173312 B1 | 3/1999 |
| KR | 100208475 B1 | 4/1999 |
| KR | 10-2009-0075346 A | 7/2009 |

OTHER PUBLICATIONS

Office Action issued Sep. 16, 2013 in KR Application No. 10-2012-0094969.

(Continued)

*Primary Examiner* — Thomas A Hollweg
*Assistant Examiner* — Kevin Quarterman
(74) *Attorney, Agent, or Firm* — Panitch Schwarze Belisario & Nadel LLP

(57) ABSTRACT

Provided are a method of producing a polymer dispersed liquid crystal device with a cooling plate and a polymer dispersed liquid crystal device using the same. According to the producing method of the invention using the cooling plate capable of effectively removing heat with a simple method, it is possible to improve driving voltage characteristics and decrease a production cost of the polymer dispersed liquid crystal device.

6 Claims, 13 Drawing Sheets

(56) References Cited

U.S. PATENT DOCUMENTS

2009/0122236 A1* 5/2009 Shutou et al. ............... 349/96
2010/0279125 A1* 11/2010 Buyuktanir et al. .......... 428/432
2011/0104389 A1* 5/2011 Bryan-Brown et al. ...... 427/510
2011/0234944 A1* 9/2011 Powers et al. ............... 349/86

OTHER PUBLICATIONS

Lee et al, "Effect of the cooling plate of PDLC properties," 2012 Spring Joint Symposium Journal of the Electric Properties and Application Society-Affilitated Research Society, vol. 2012, No. 5, p. 71 (May 18, 2012).

* cited by examiner (a)

(b)

(a)　　　　　　　　　　　　(b)

(a)

(b)

(a)

(b)

(a)

(b)

(a)

(b)

(a) (b)

(a) (b)

METHOD OF PRODUCING POLYMER DISPERSED LIQUID CRYSTAL DEVICE USING COOLING PLATE

CROSS-REFERENCE TO RELATED APPLICATION

This application claims priority to and the benefit of Korean Patent Application No. 2012-0094649, filed Aug. 29, 2012, the disclosure of which is incorporated herein by reference in its entirety.

BACKGROUND

1. Field of the Invention

The present invention relates to a method of producing a polymer dispersed liquid crystal device with a cooling plate and a polymer dispersed liquid crystal device using the same.

2. Discussion of Related Art

Existing eyeglasses used by people with weak vision are of a fixed strength, and thus it is necessary to replace the eyeglasses as vision worsens. Especially, when farsightedness occurs as people age, people who were already myopic have difficulty seeing text both near and far. Out of existing eyeglasses, sunglasses are widely used by people with normal vision to block direct sunlight and UV rays, especially overseas. In recent years, in order to find solutions to the problems of the existing eyeglasses, research on smart electronic eyeglasses has been underway. The principle is using an optical shutter function for blocking or transmitting light which is a fundamental role of the liquid crystal. The optical shutter employing such liquid crystal is referred to as a crystal device, or simply a device, in order to differentiate it from the existing eyeglasses. The crystal device can be electronically operated based on the external light intensity. When the external light intensity is high, that is, light is strong, the liquid crystal shutter is largely open, whereas when light is weak, the liquid crystal shutter opens little so as to control the amount of light. By combining these features with an electronic circuit serving as a switch in addition to a sensor for measuring the external light intensity, it is possible to configure electronic eyeglasses employing a so-called autoshading function of a crystal device which performs more active functions than the sunglasses. In addition, a focal length of the crystal device can be adjusted by controlling the voltage applied to the electrodes which are divided into multiple levels such that electrodes are effectively arranged in the vicinity of high-refractive-index liquid crystal or the crystal device is formed in a three-dimensional manner. In this case, by combining a distance measurement sensor with an electronic circuit having an electrode driving control function, it is possible to manufacture electronic eyeglasses having a strength function which can cope with myopia or hypermetropia. Further, the smart electronic eyeglasses in which the above-described autoshading function and the degree function are combined and a variety of software is installed are under development.

Such a crystal device uses a nematic liquid crystal in the manufacturing of a TFT-LCD. Due to the limitation of the material itself, the reaction rate of the nematic liquid crystal is relatively slow, and a manufacturing process thereof is complex, requiring many manufacturing facilities. Further, additional films such as a polarizing plate are necessary. In particular, in terms of the basic principle of the nematic liquid crystal, polarizing plates are attached to the front and rear surfaces of the nematic liquid crystal device one by one, and thus the cost increases and light transmittance is reduced by 35% or more. Furthermore, a very complex process including an alignment process using polyimide and a liquid crystal injection process degrades a yield of the nematic liquid crystal and the productivity.

Recently, in order to overcome the shortcomings of such a nematic liquid crystal device, new liquid crystal materials and crystal devices have been proposed.

In terms of the basic principle of the nematic liquid crystal, with simple manufacturing processes and manufacturing facilities, the polymer dispersed liquid crystal does not require the polarizing plate and the polyimide alignment for an array of liquid crystal. As a result, light transmittance reaches 100% in theory and it is possible to overcome most problems of the nematic liquid crystal described above.

However, because a material made of a polymer is employed, the polymer dispersed liquid crystal device has a problem in that a driving voltage is higher than the nematic liquid crystal. When the driving voltage is high, an electrical efficiency for driving the polymer dispersed liquid crystal device decreases and the battery consumption increases. Further, it is very dangerous since the user wears the electrical eyeglasses in front of her or his eyes. When the driving voltage is 30 V or more, the manufacturing cost of a driving circuit increases greatly. Accordingly, it is necessary to improve the characteristics of the driving voltage, which is one of the biggest shortcomings of the polymer dispersed liquid crystal device.

SUMMARY OF THE INVENTION

The present invention has been made in view of the above-described problems and an object of the invention is to provide a method of producing a polymer dispersed liquid crystal device capable of lowering a driving voltage without a significant effect on other electro-optical characteristics of the polymer dispersed liquid crystal device.

The invention relates an effective method of removing heat generated by light in the ultraviolet (UV) light irradiation process in the production process of the polymer dispersed liquid crystal device using a cooling plate.

The method of producing the polymer dispersed liquid crystal device of the invention includes: (a) a step of forming a gap by bonding two to seven substrates with a spacer absorbed therebetween using a UV adhesive; (b) a step of injecting a liquid crystal mixture in which a pre-polymer and liquid crystal are mixed into the gap; and (c) a step of curing and cooling, in which curing with UV light and cooling with a cooling plate are preformed. In addition, the invention relates to the polymer dispersed liquid crystal device produced according to the above-described method.

According to the producing method of the invention using the cooling plate capable of effectively removing heat with a relatively simple method, it is possible to improve driving voltage characteristics and decrease the producing cost of the polymer dispersed liquid crystal device.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which:

FIG. 13(a) is a microscopic photograph of the PDLC without the cooling plate, whereas FIG. 13(b) is a microscopic photograph of the PDLC with the cooling plate.

FIG. 14(a) is an SEM photograph of the PDLC without the cooling plate, whereas 14(b) is an SEM photograph of the PDLC with the cooling plate.

DETAILED DESCRIPTION OF EXEMPLARY EMBODIMENTS

A method of producing a polymer dispersed liquid crystal (PDLC) device of the invention includes: (a) a step of forming a gap by bonding two to seven substrates with a spacer absorbed therebetween using a UV adhesive; (b) a step of injecting a liquid crystal mixture in which a pre-polymer and liquid crystal are mixed into the gap; and (c) a step of curing and cooling, in which curing with UV and cooling with a cooling plate are performed.

Figure 1:
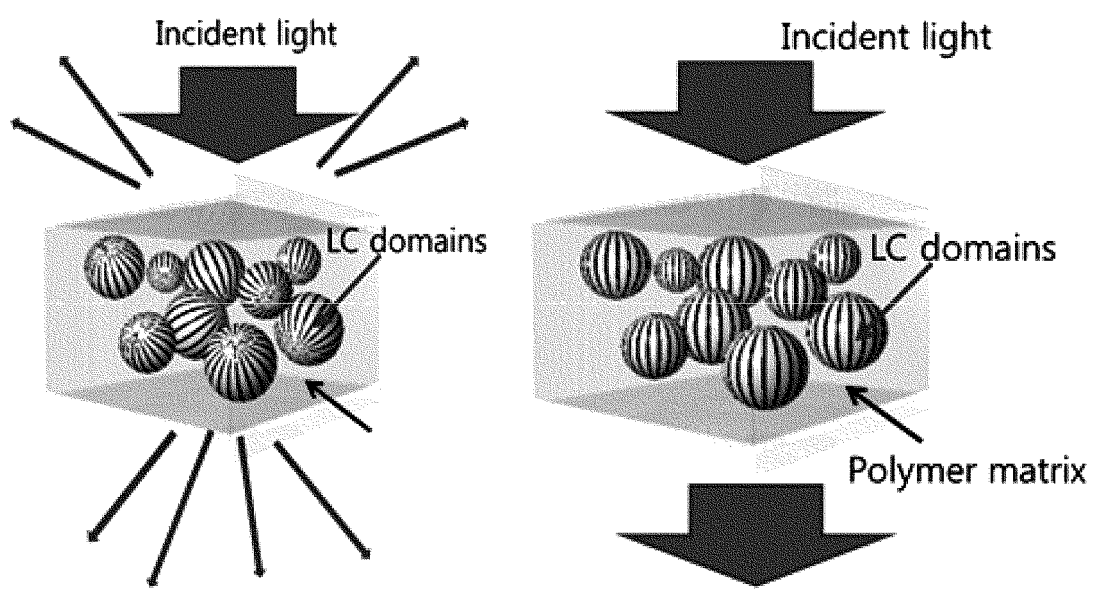
FIG. 1 illustrates an operating principle of a polymer dispersed liquid crystal (PDLC).

As illustrated in FIG. 1, as the basic driving principle of the PDLC device, an alignment of the liquid crystal is randomly arranged in the liquid crystal droplets and light is scattered when an electric field is not applied. On the other hand, directivity of the liquid crystal is arranged in the electric field direction and light is transmitted when the electric field is applied. Transmittance is determined based on a difference between the refractive index of the liquid crystal phase and the refractive index of the polymer. When the electric field is removed again, light is scattered, realizing an initial state.

In general, the PDLC is configured with elliptical liquid crystal droplets having a diameter of 2 to 5 μm which are uniformly dispersed on the polymer film having a thickness of 20 to 50 μm.

In step (a), the substrate is not limited thereto, but may be an indium-tin oxide deposited glass, polycarbonate, polyethylene terephthalate, polyethylenesulfone, polyimide, a polycyclic olefin, polyalylate, polyethylene naphthalate or polyether ether ketone.

Step (a) is a step of forming a gap by bonding two to seven substrates with a spacer absorbed therebetween using a UV adhesive and may be manufactured by a photolithography method using a spacer having a height of 5 to 50 μm with a negative PR on the substrate.

The material of the spacer may be poly(methyl methacrylate) (PMMA) but is not limited thereto.

Step (b) is a step of injecting a liquid crystal mixture in which a pre-polymer and liquid crystal are mixed into the gap. The PDLC device includes a pre-polymer for forming a polymer and liquid crystal, and the pre-polymer but may be an acrylate-based, thiolene-based, or epoxy-based pre-polymer, but is not limited thereto. The acrylate-based pre-polymer is a monomer having an acrylic acid structure consisting of a vinyl group and a carboxylic acid terminal group. The thiolene-based pre-polymer is a monomer an S—H bond is added to double or triple carbon bonds by free radicals or ionic reactions. The epoxy-based pre-polymer may be a monomer having an epoxy bond.

An embodiment of the invention uses NOA 65 (a monomer mixture of (tetrafunctional allylether (4-AE) and trifunctional thiol (3-SH)+benzo-phenone photoinitiator).

As the liquid crystal (LC), liquid crystal having a refractive index similar to the pre-polymer may be used, but it is not limited thereto, and may be an E7 liquid crystal. The E7 liquid crystal consists of n-pentylcyanobiphenyl (5CB) (51%), n-heptylcyanobiphenyl (7CB) (25%), n-octyloxycyanobiphenyl (8OCB) (16%), and n-pentylcyanoterphenyl (8%). The E7 liquid crystal forms a nematic intermediate phase in the range of −30° C. to 61° C.

The mass ratio between the pre-polymer and the liquid crystal may be from 50:50 to 20:80.

Step (c) is a step of curing and cooling, in which curing with UV and cooling with a cooling plate are performed. The UV curing intensity may be 80 to 780 μW/cm$^2$, and a temperature in the UV irradiation process is maintained in the range of 5 to 25° C. using the cooling plate.

According to the embodiment of the invention, the PDLC is produced by a polymerization induced phase separation (PIPS) process in which the pre-polymer and E7 liquid crystal are uniformly dispersed, and then the UV curing is performed so as to polymerize the pre-polymer and induce phase separation from the liquid crystal. The PDLC is configured with elliptical droplets having a diameter of 2 to 5 μm which are uniformly dispersed on the polymer film having a thickness of 20 to 50 μm.

Figure 15:
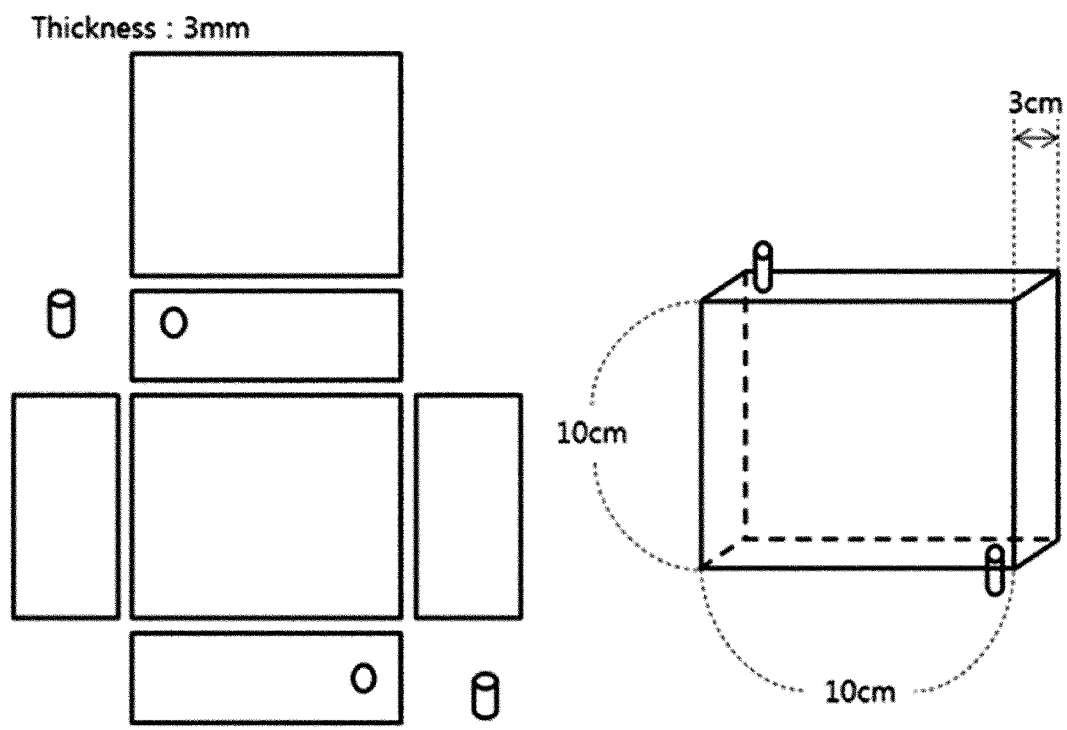
FIG. 15 illustrates a drawing and a structure of the cooling plate.

The cooling plate prevents the temperature from rising in the UV curing process. FIG. 15 illustrates a drawing and a structure of the cooling plate.

The cooling plate allows the water to continuously circulate inside copper metal having a fast heat transfer rate so as to quickly and effectively remove the heat energy generated by the UV light while curing the pre-polymer with the UV irradiation from the PDLC device and maintain a low temperature, thereby producing the PDLC device with a low temperature in the range of X to Y° C. Compared to a nematic liquid crystal device, the PDLC device has many advantages in terms of the electro-optical characteristics and the producing process characteristics. However, due to the characteristics of the PDLC device and the chemical composition thereof, the driving voltage is very high, which causes an increase in the cost of the driving circuit and the control circuit of the PDLC device, and it has disadvantages in mobile communication devices due to large battery consumption. Therefore, by simply using the cooling plate in the UV irradiation process, it is possible to reduce the power consumption, and the manufacturing cost of the driving circuit and the control circuit by at least 25%.

Figure 4:
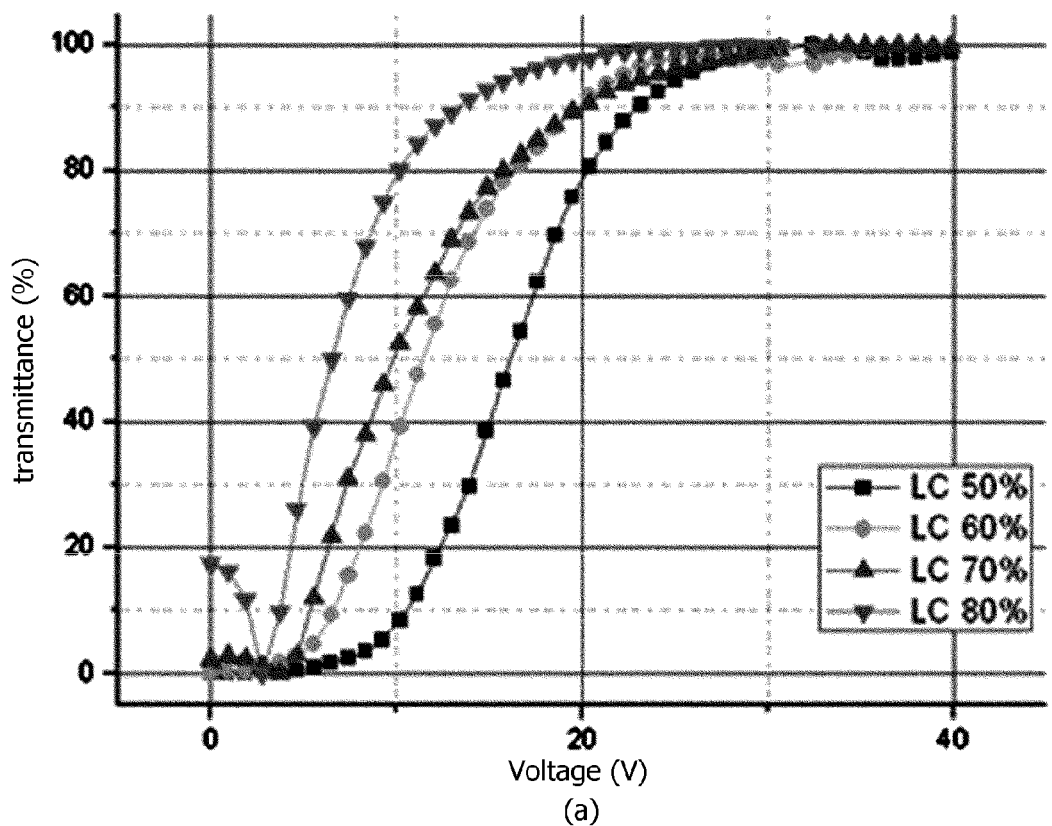
FIGS. 4(a) and 4(b) illustrate curves between an applied voltage and light transmittance of the polymer crystal device according to a liquid crystal concentration while the cooling is performed 4(a) or not performed 4(b).
Figure 4:
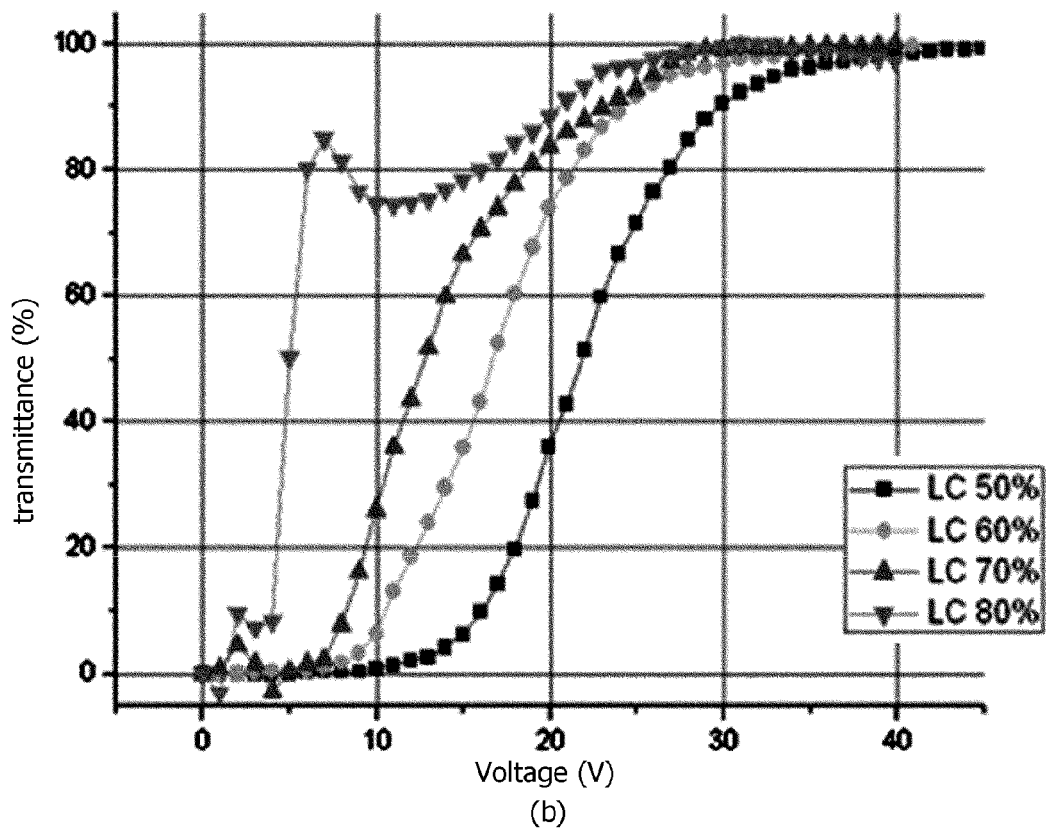
Figure 6:
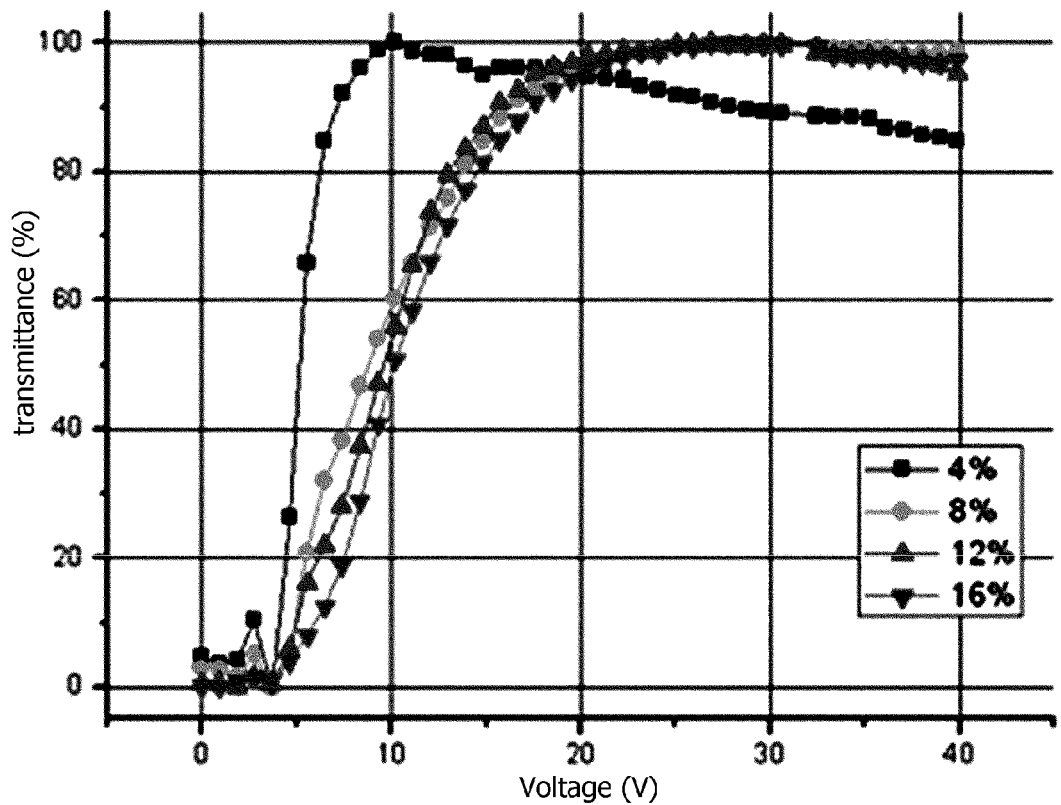
FIGS. 6(a) and 6(b) illustrate curves between an applied voltage and light transmittance of the polymer liquid crystal device according to the UV curing intensity while the cooling is performed 6(a) or not performed 6(b).
Figure 6:
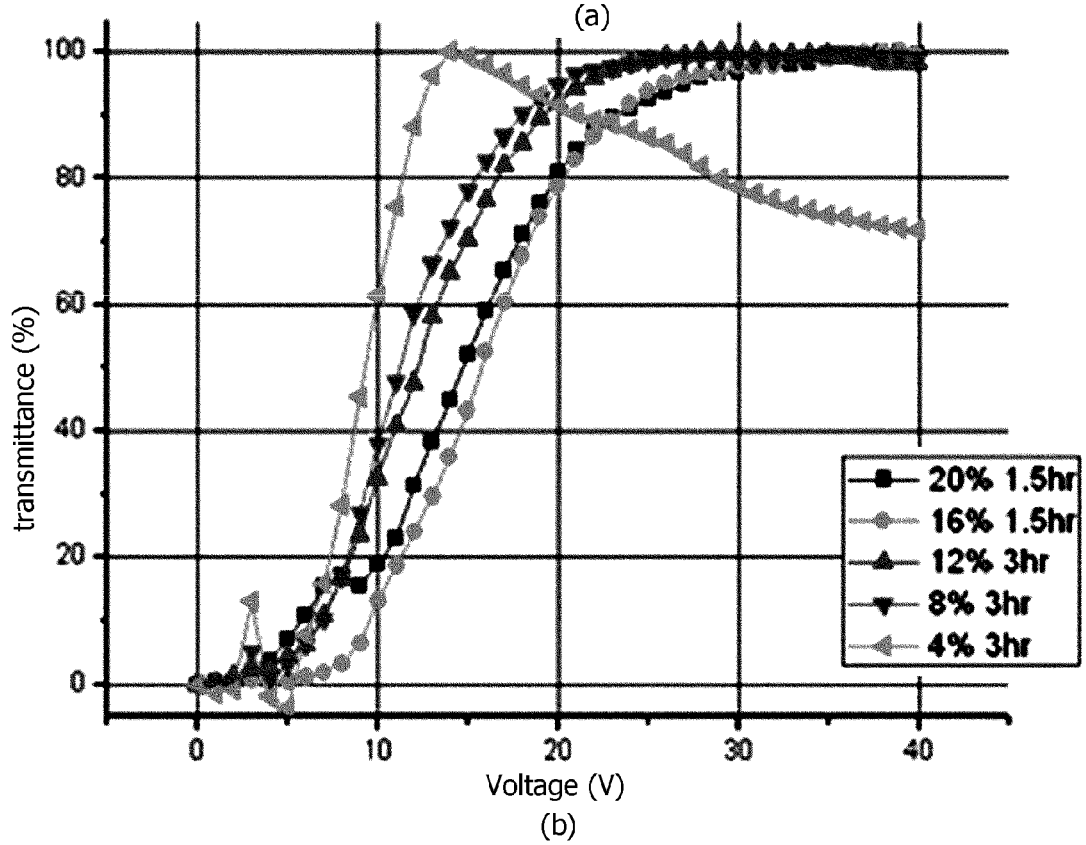

As illustrated in FIGS. 4 and 6, comparing when the cooling plate is used (FIGS. 4(a) and 6(a)) and not used (FIGS. 4(b) and 6(b)), light transmittance according to the applied voltage is rapidly changed when the cooling plate is used. Rapid change occurs in the external voltage range of 5 V to 15 V when cooling is performed in the UV curing, but occurs in the external voltage range of 10 V to 20 V when cooling is not performed in the UV curing. Due to a rapid change of the light transmittance according to the applied voltage, it is possible to make a large change of the light transmittance with a small amount of variation in the applied voltage. When the PDLC device adjusts an active shutter glass used for 3D HDTV or automatically adjusts the light intensity based on a change of external light intensity, the PDLC device which allows a very large change in transmittance according to the applied voltage is necessary. Accordingly, it is possible to manufacture the PDLC device having an excellent electro-optical characteristic using the cooling plate in the UV irradiation process.

The invention relates to the PDLC device produced by the above-described producing method. The PDLC device according to the invention decreases the driving voltage, improves the reaction rate, and increases the contrast ratio, and furthermore, reduces the producing cost of the PDLC device, decreases the manufacturing cost of the driving circuit, and reduces the power consumption, due to a decrease in the driving voltage.

The electro-optical characteristics of the PDLC device (lens) are determined based on a thickness of the PDLC portion and a size and a distribution of the liquid crystal droplets. However, when the thickness of the PDLC device is very small, it is difficult to acquire high haze and a high contrast ratio value. Therefore, when the thickness thereof is fixed about 30 μm, since the electro-optical characteristics of the PDLC device are changed only by the liquid crystal droplets, a ratio between the liquid crystal droplets and the polymer, the UV irradiation intensity, temperature, a type of additives, and concentration may have an affect thereon.

Figure 3:
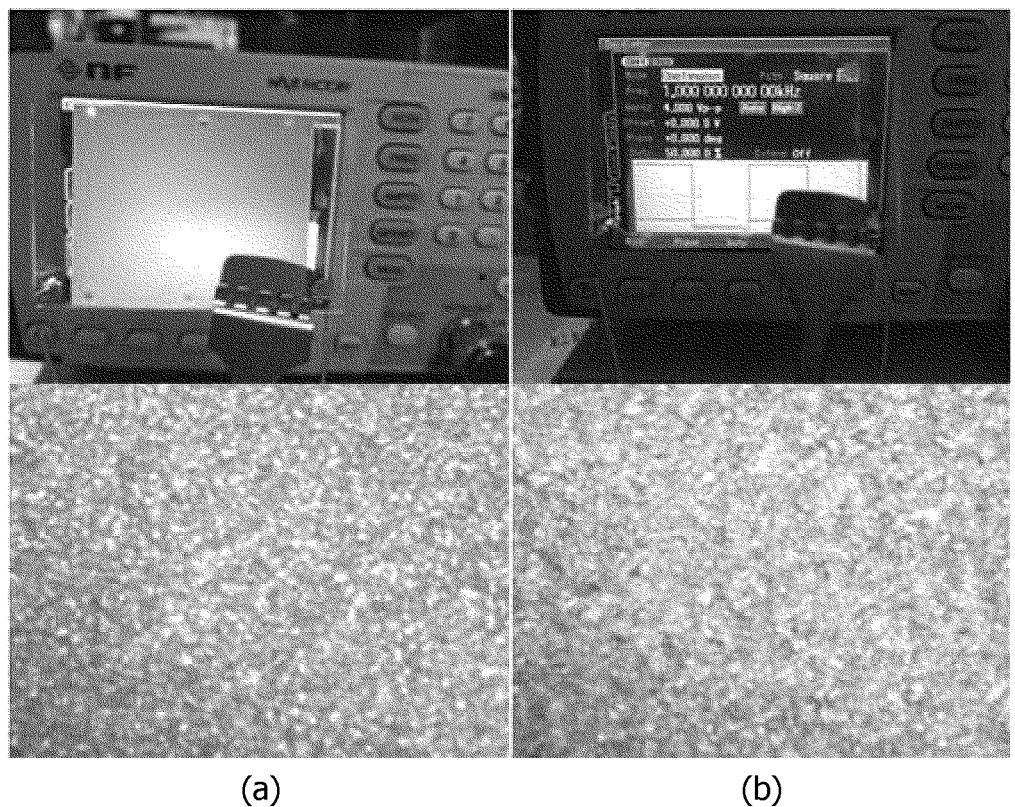
FIGS. 3(a) and 3(b) are photographs showing microstructures of a PDLC device and a polymer network liquid crystal.

FIGS. 3(a) and 3(b) illustrate an embodiment of the PDLC device and show photographs of operating the PDLC device having a cell gap of 30 μm in which a ratio of NOA 65 to the liquid crystal (E7) is 40:60 and microstructures of the polymer network liquid crystal. FIG. 3(a) is photographs showing the PDLC device when power is not applied to the manufactured PDLC device, and a microstructure photograph configured with the PDLC device thereof and the polymer network liquid crystal. FIG. 3(b) is photographs showing the PDLC device when power is applied to the manufactured PDLC device, and the PDLC device thereof and a microstructure of the liquid crystal. NOA 65 (40%) and E7 liquid crystal (60%) are uniformly mixed with a cell gap of 30 μm, and an applied voltage of 40 V. When the external voltage is not applied, a domain of the liquid crystal is observed well. However, when the external voltage is applied, since light is transmitted, it is difficult to observe the liquid crystal domain. As a result, as illustrated in FIGS. 3(a) and 3(b), when the voltage is not applied, since light is scattered in the liquid crystal domain, the device appears white. On the other hand, in the PDLC device in FIG. 3(b), when the voltage is applied, since the liquid crystal domain is aligned to the voltage applying direction, light is transmitted without scattering and the device appears transparent.

Hereinafter, in order to help with understanding of the invention, embodiments will be described in detail, but the exemplary embodiments should be considered in a descriptive sense only and the invention is not limited by following embodiments. These embodiments are provided so that this disclosure will be thorough and complete, and will fully convey the concept of the invention to those skilled in the art.

EMBODIMENT

1. Producing the PDLC Device

Figure 2:
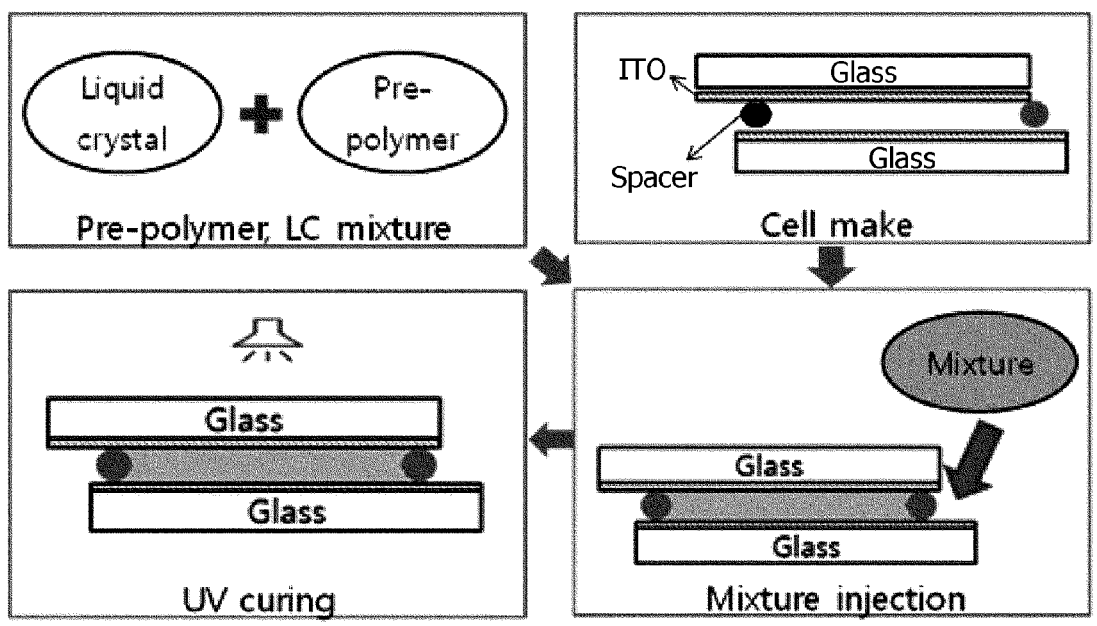
FIGS. 2(a) and 2(b) illustrate an embodiment of a production process flow of a UV curable PDLC device.
Figure 2:
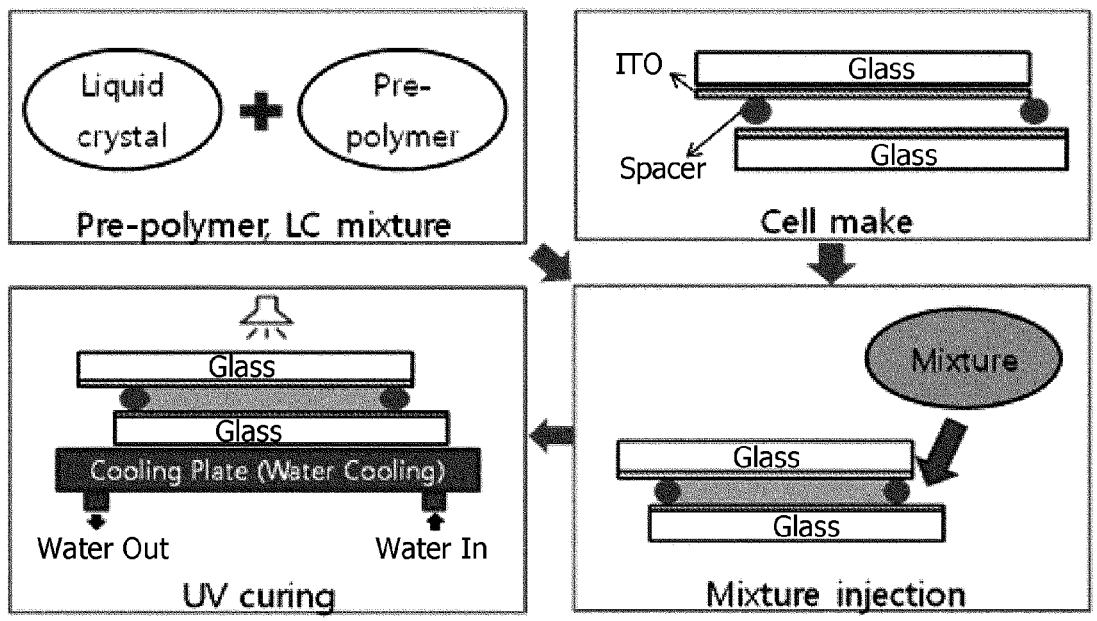

A producing process of the PDLC device is given below (FIGS. 2(a) and 2(b)). In order to juxtapose ITO-deposited portions, a gap was formed by bonding glass substrates with a spacer having a height of 30 μm which was adsorbed therebetween using a UV adhesive.

Next, using a magnetic stirrer provided in the mixer, NOA 65 and E7 were stirred for 24 hours at room temperature to be mixed uniformly such that the ratio between NOA 65 and E7 was 20:80, 30:70, 40:60, and 50:50. The liquid crystal mixture was poured into the gap.

Curing through irradiation was performed with a UV curing intensity of 80 μW/cm$^2$ to 780 μW/cm$^2$, the center wavelength of the UV light was 365 nm, and the time for irradiation was 3 hours for sufficient UV irradiation. When the UV curing intensity was higher, the time for irradiation was 1.5 hours in consideration of reliability in heat generation and mercury.

The PDLC was produced using the cooling plate in the UV irradiation while the temperature was maintained at 20° C.

2. Efficacy According to Presence of the Cooling Plate (1) A Change of Light Transmittance Based on a Ratio Between NOA 65 and E7, and a Liquid Crystal Concentration Dependency on the Applied Voltage 1) A Change of Light Transmittance A change of light transmittance of the polymer liquid crystal according to the external voltage was investigated while the temperature was constantly maintained at 20° C. using the cooling plate, or the temperature was maintained high at 70 to 80° C. without the cooling plate during the UV irradiation, under the same curable conditions of the UV irradiation intensity of 580 μW/cm$^2$ by varying the ratio between the liquid crystal (E7) and the polymer (NOA 65) from 50:50 to 80:20 (FIGS. 4(a) and 4(b)). The cooling process of the PDLC device was observed in the UV curing process immediately before the final polymer PDLC was manufactured as illustrated in lower right corners in FIGS. 2(a) and 2(b) and the cooling process indicates whether or not the device is being cooled. Comparing FIGS. 4(a) and 4(b), the light transmittance curves of the cooled PDLC device are moved to the left side in graph, that is, all curves are moved to the low-voltage side. As illustrated in FIGS. 4(a) and 4(b), regardless of the liquid crystal concentration, when the PDLC device was cooled during the UV curable process, the driving voltage was reduced.

2) A Liquid Crystal Concentration Dependency on the Applied Voltage at the Event of the Driving Voltage-Light Transmittance of 90%

Figure 5:
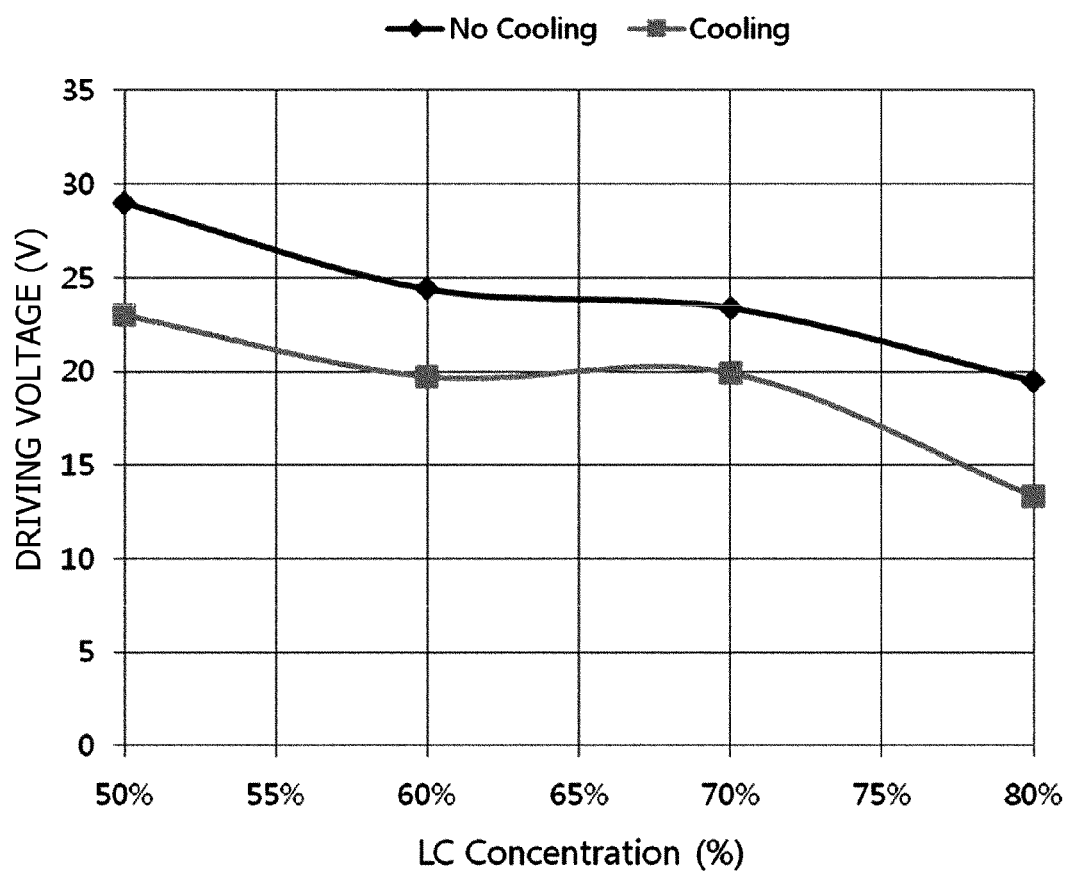
FIG. 5 illustrates driving voltage changes of the PDLC device according to the liquid crystal concentration while the cooling is performed or not performed.

A liquid crystal concentration dependency on the applied voltage when the driving voltage-light transmittance was 90% as measured by curves in FIGS. 4(a) and 4(b) was observed (FIG. 5). When the cooling was performed, all the driving voltages were reduced by 3.5 V to 6.2 V, as compared with when the cooling was not performed. This reduction ratio in the driving voltage corresponded to a maximum of 46.6% and to a minimum of 17.6%. In the main composition of NOA 65:E7=40:60, the driving voltage reduction of 4.7 V and the reduction ratio of 23.9% were achieved.

(2) A Change of Light Transmittance According to the UV Irradiation Intensity and a UV Curing Intensity Dependency on the Applied Voltage 1) A Change of Light Transmittance When the ratio between the liquid crystal (E7) and the polymer (NOA 65) was fixed to 60:40, and the UV irradiation intensity varied from 80 μW/cm² to 780 μW/cm², a change of light transmittance of the polymer liquid crystal according to the external voltage was investigated while the temperature was constantly maintained at 20° C. using the cooling plate, or the temperature was maintained high at 70 to 80° C. without the cooling plate during the UV irradiation (FIGS. 6(a) and 6(b)). In FIGS. 6(a) and 6(b), the UV curing intensity % was a setting value of the UV curator and was used for experimental convenience. The actually measured UV curing intensity is calculated as follows:

UV curing intensity (mW/cm²)=42.5×UV curator setting value (%)−86

The UV curator setting values used in the experiment and actual UV intensities correspond to Table 1. Table 1 shows the UV curator setting value and actual UV intensity.

TABLE 1

| UV curator setting (%) | UV intensity (mW/cm²) |
|---|---|
| 4 | 80 |
| 8 | 280 |
| 12 | 400 |
| 16 | 580 |
| 20 | 780 |

Comparing FIGS. 6(a) and 6(b), the light transmittance curves of the cooled PDLC device are moved to the left side in graph, that is, all curves are moved to the low-voltage side. As illustrated in FIGS. 6(a) and 6(b), regardless of the UV curing intensity, when the PDLC device was cooled during the UV curable process, the driving voltage was reduced.

2) A UV Curing Intensity Dependency on the Applied Voltage at the Event of the Driving Voltage-Light Transmittance of 90%

Figure 7:
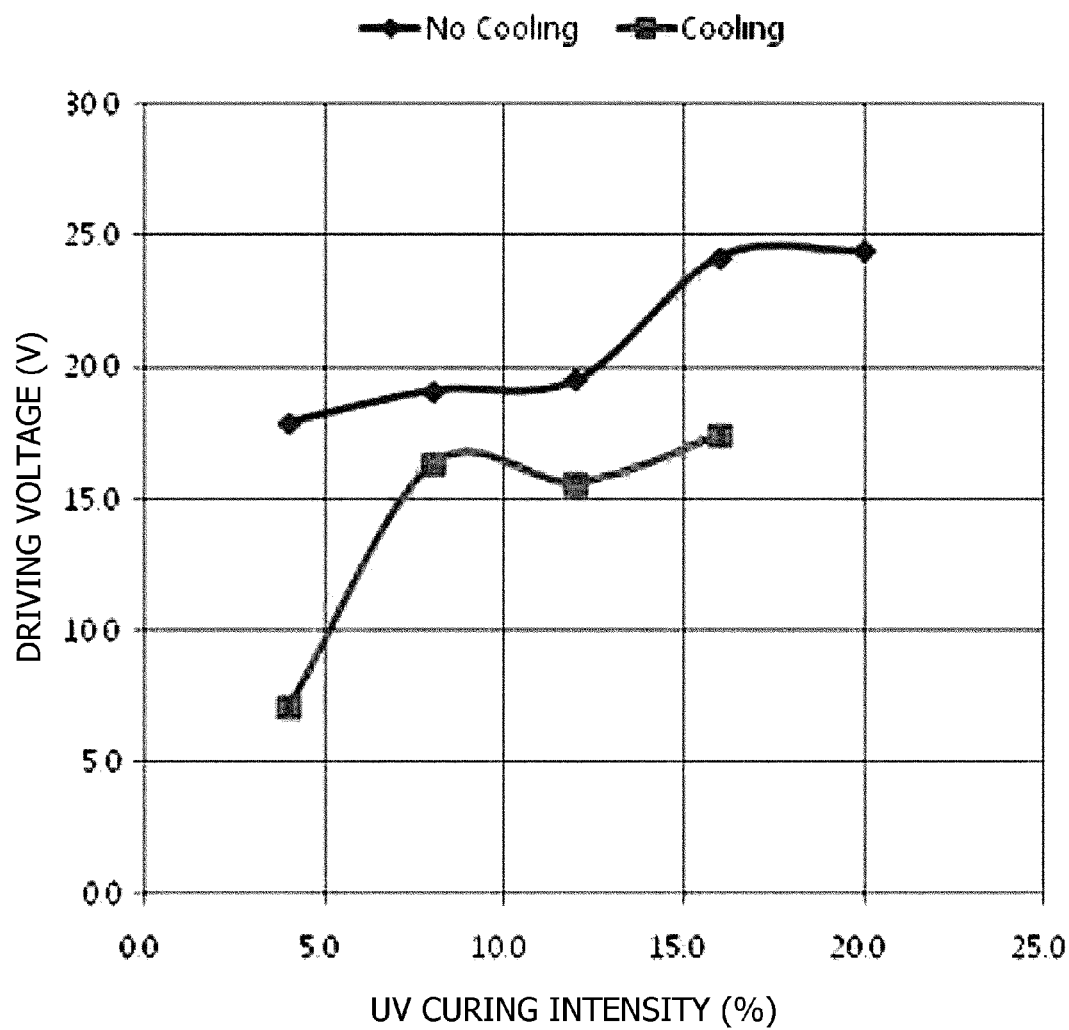
FIG. 7 illustrates driving voltage changes of the PDLC device according to the UV curing intensity while the cooling is performed or not performed.

A UV curing intensity dependency on the applied voltage when the driving voltage-light transmittance was 90% as measured by curves in FIGS. 6(a) and 6(b) was observed (FIG. 7). When the cooling was performed, all the driving voltages were reduced by 2.8 V to 17.4 V, as compared with when the cooling was not performed. This reduction ratio in the driving voltage corresponded to a maximum of 152.1% and to a minimum of 17.2%.

(3) Electro-Optical Characteristics

Figure 8:
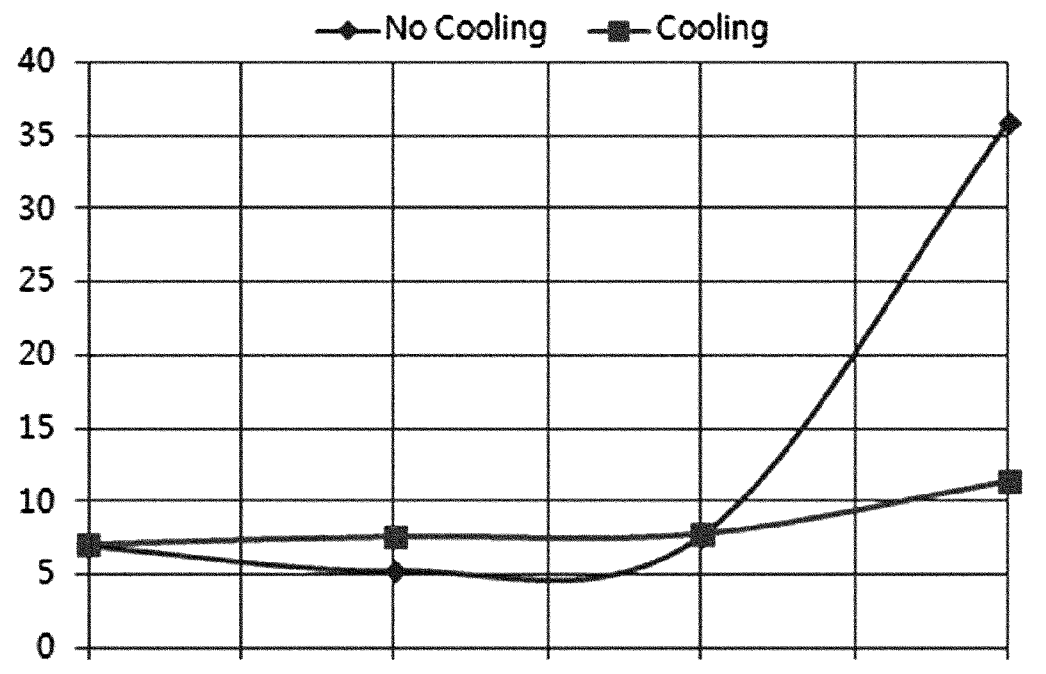
FIGS. 8(a) and 8(b) illustrate gradient changes in the driving range of the PDLC device while the cooling is performed or not performed, where 8(a) is based on the liquid crystal concentration and 8(b) is based on the UV curing intensity.
Figure 8:
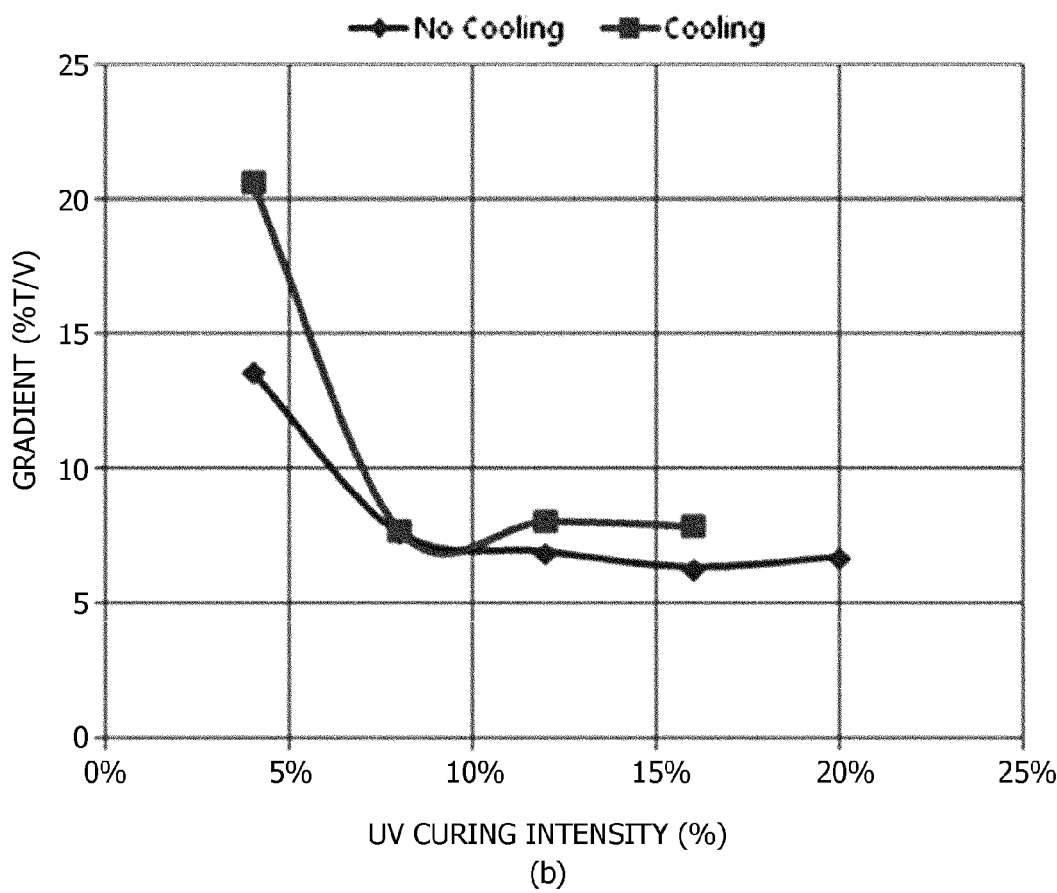
Figure 9:
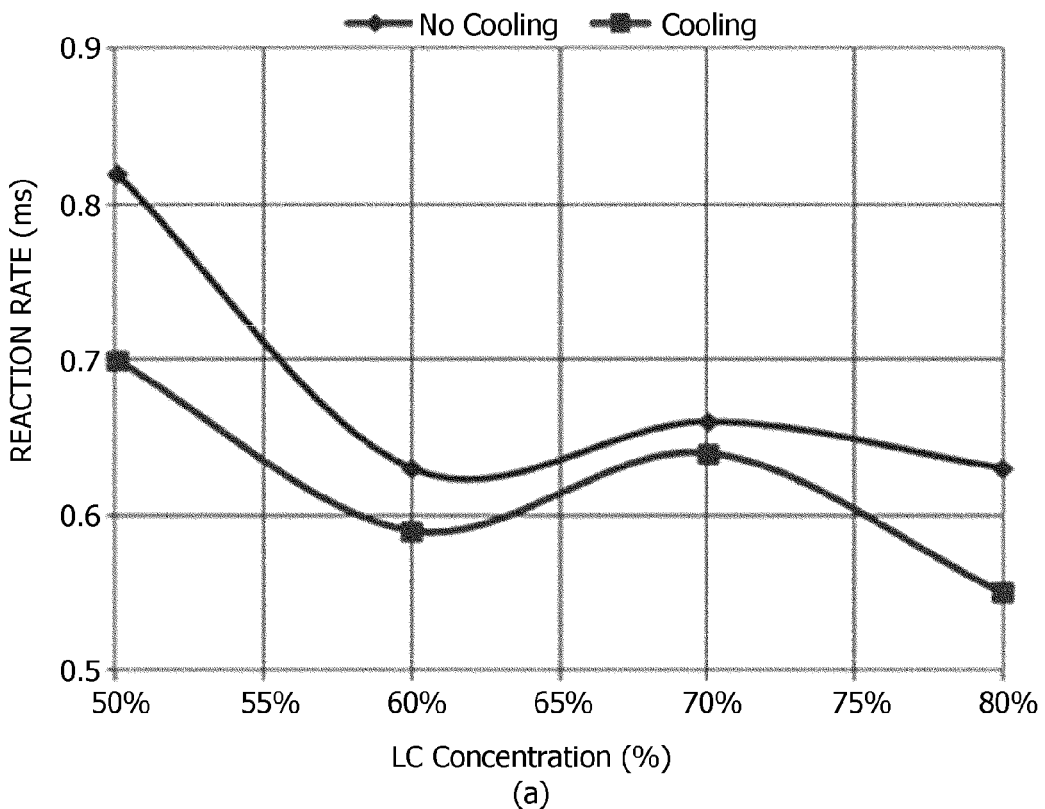
FIGS. 9(a) and 9(b) illustrate response rate changes of the PDLC device according to the presence of the cooling plate in the UV irradiation process and the liquid crystal concentration, where 9(a) is rising response time and 9(b) is falling response time.
Figure 9:
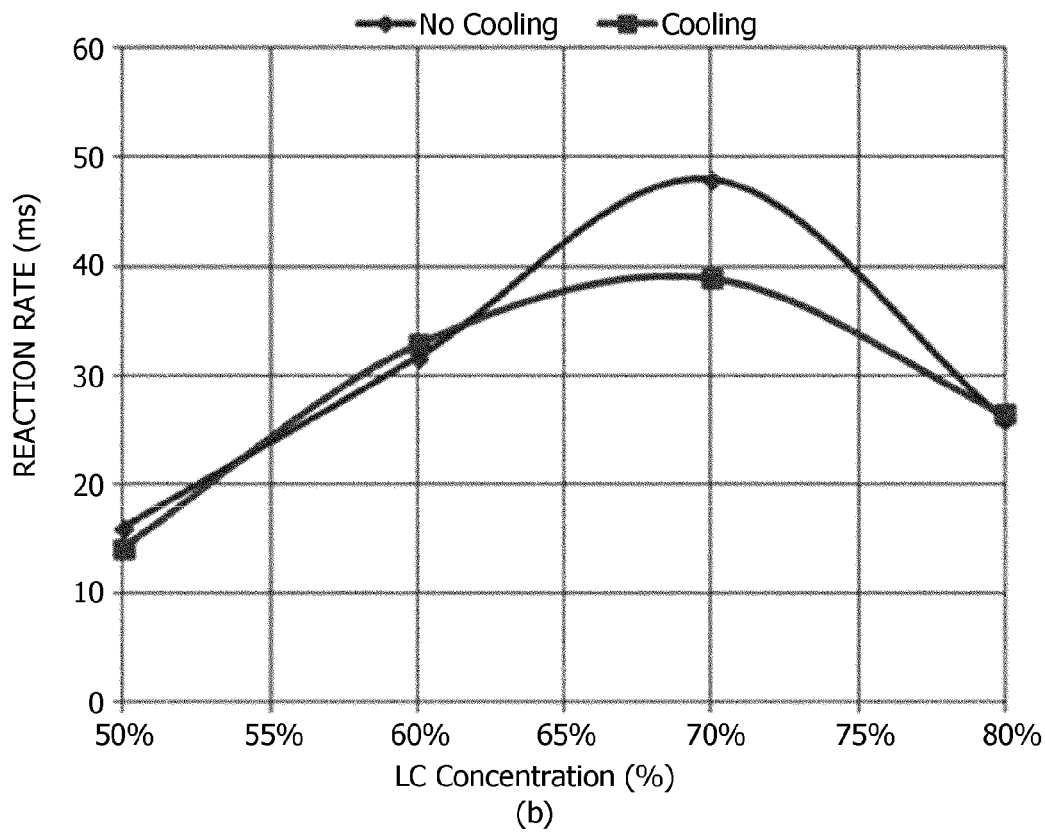
Figure 10:
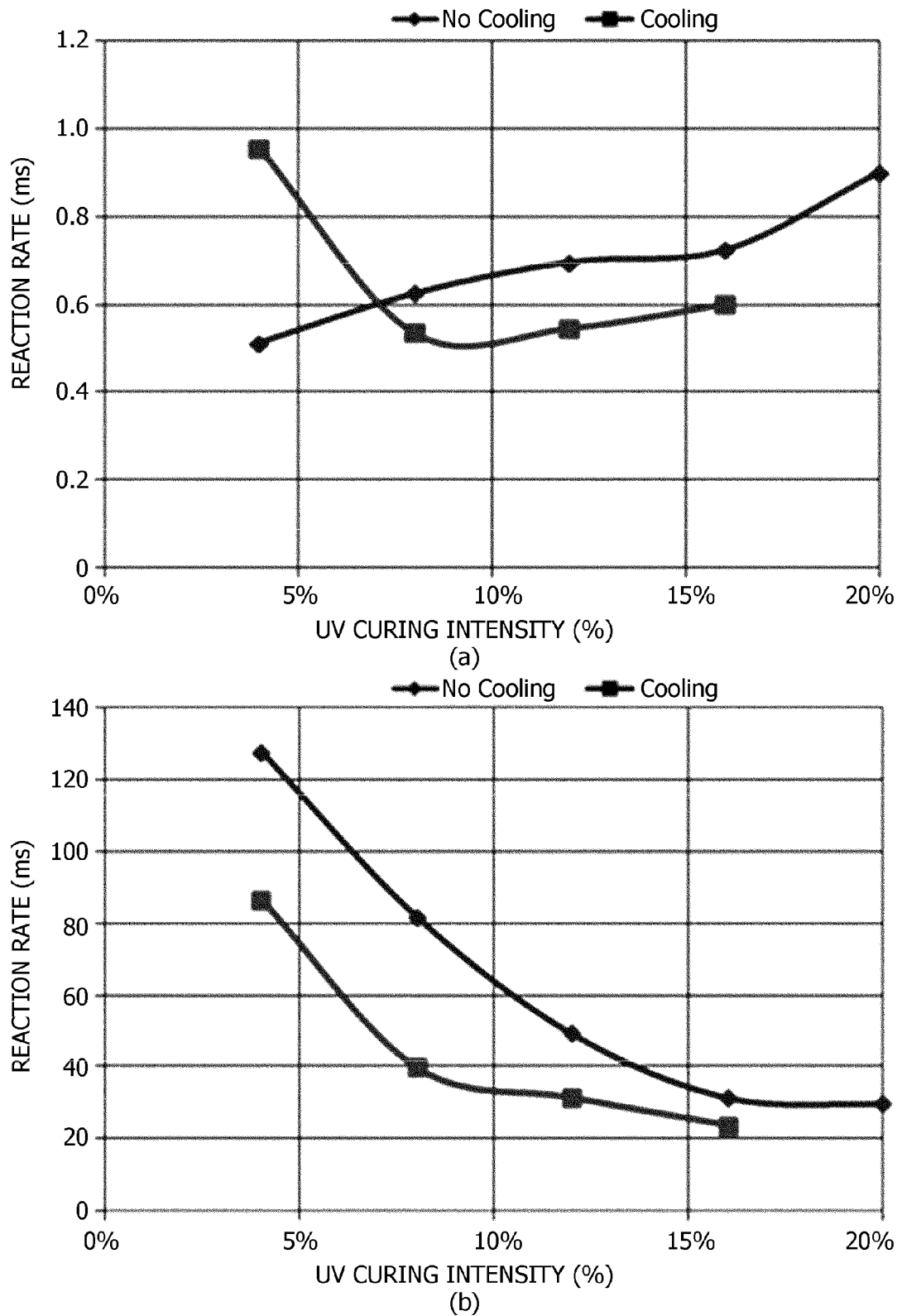
FIGS. 10(a) and 10(b) illustrate response rate changes of the PDLC lens according to the presence of the cooling plate in the UV irradiation process and the UV curing intensity, where 10(a) is rising response time and 10(b) is falling response time.
Figure 11:
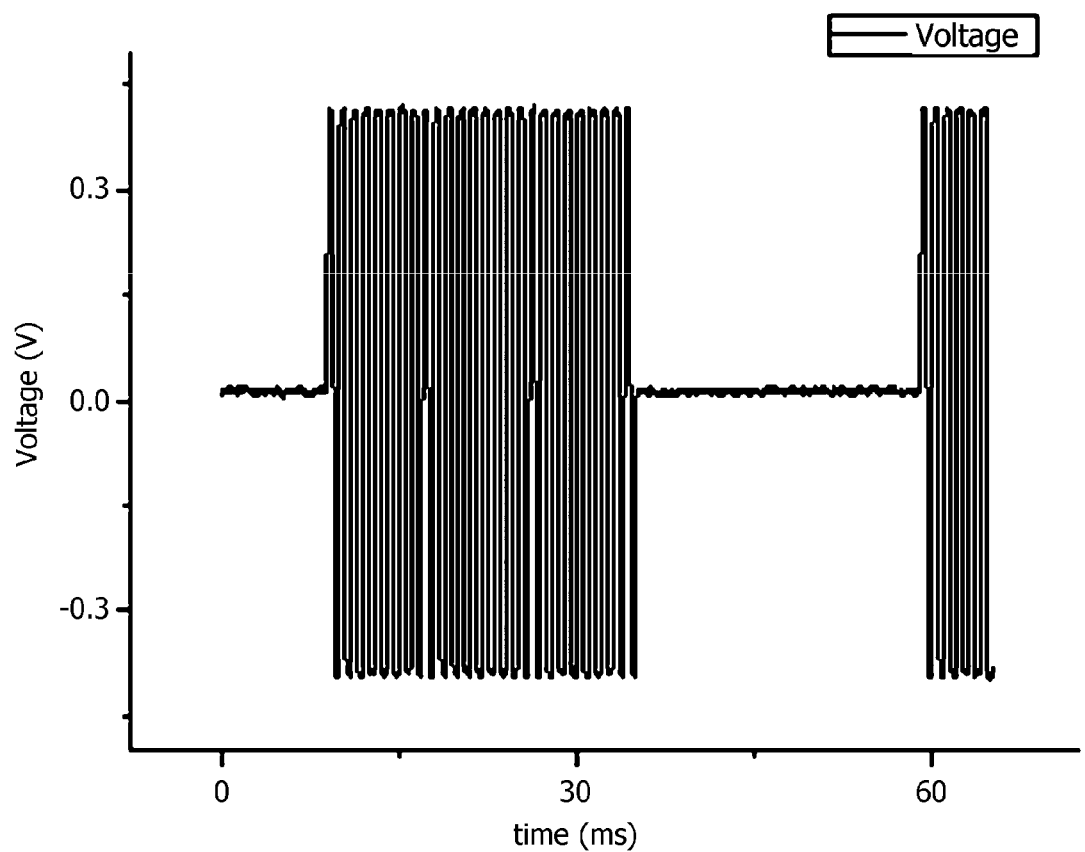
FIG. 11 illustrates an external voltage profile for measuring the response rate of the PDLC device.

A gradient change in the driving range of the PDLC device while the cooling was and was not performed according to the liquid crystal concentration and the UV curing intensity was investigated (FIGS. 8(a) and 8(b)). As illustrated in FIGS. 8(a) and 8(b), when the device was cooled in the UV curing process, an increase of the gradient as the electro-optical characteristic improved, compared with when the device was not cooled. In. FIG. 8(a), at the liquid crystal concentration of 80%, the value was high when the cooling was not performed, but this concentration range was considered to be a range of polymer network liquid crystal (PNLC), and the microstructure differs in the device. In the cooled device of the liquid crystal concentration of 80%, due to a cooling effect on the UV curing process, the microstructure was considered in the range of PDLC.

(4) Response Rate of the PDLC Device

A response rate of the PDLC device with or without the cooling plate was investigated (FIGS. 9(a) and 9(b) and FIGS. 10(a) and 10(b)). One important consideration in the PDLC device is the response rate. Similarly to the changes of the driving voltage and the gradients in the driving range, the reaction rate was reduced, thereby improving the rising and falling response times.

(5) Contrast Ratio

Figure 12:
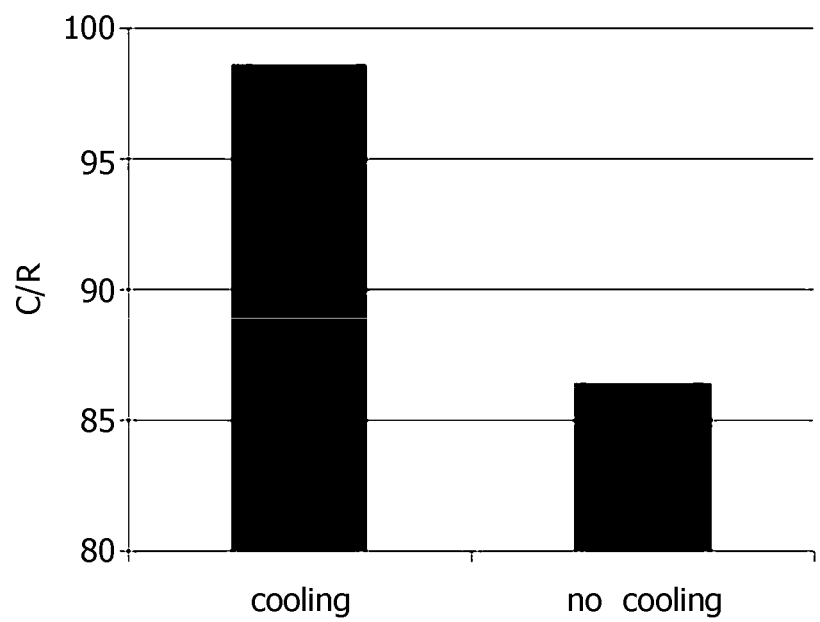
FIG. 12 illustrates a contrast ratio of the PDLC device according to the presence of the cooling plate in the UV irradiation process and the liquid crystal concentration.

A contrast ratio of the cured PDLC device in which the ratio between MOA 65 and E7 was set to 40%:60% with the UV curing intensity of 16% (580 μW/cm²) was measured (FIG. 12). Similarly to the changes of the driving voltage and the gradients in the driving range, and the reaction rate, when the PDLC device was cooled, the contrast ratio improved about 11.5%, compared to when the device was not cooled.

(6) Polymer Liquid Crystal Droplet

Figure 13:
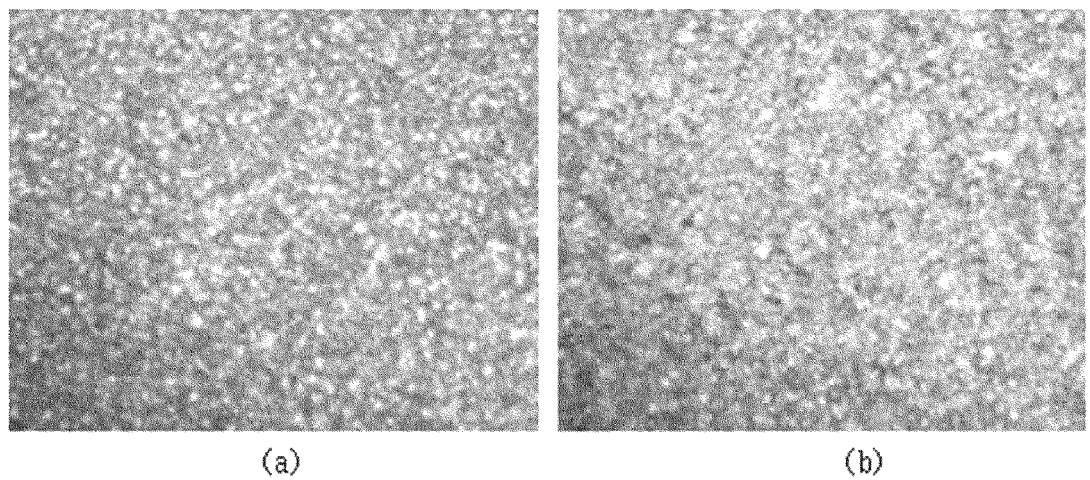
FIGS. 13(a) and 13(b) are microscopic photographs of the PDLC droplet size according to the presence of the cooling plate.
Figure 14:
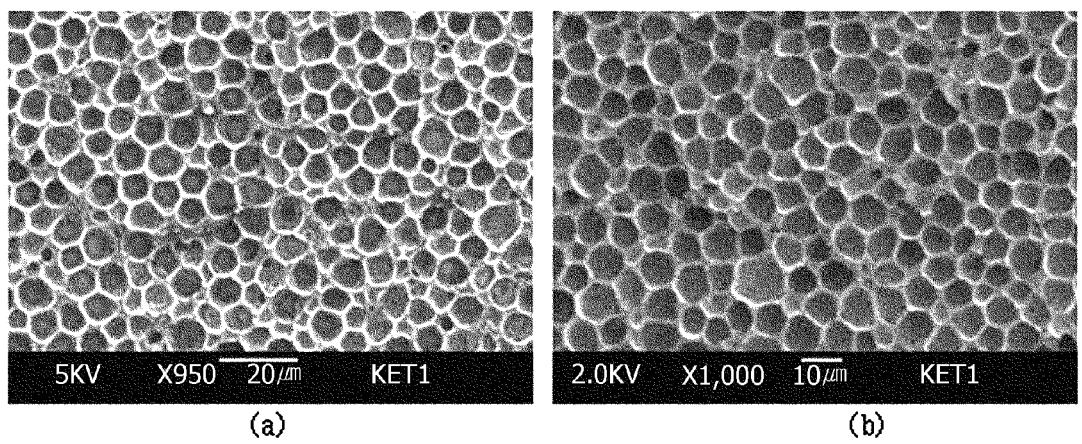
FIGS. 14(a) and 14(b) are scanning electron microscopic (SEM) photographs of the PDLC droplet size according to the presence of the cooling plate.

Optical microscopic photographs and scanning electron microscope (SEM) photographs of the PDLC device with or without the cooling plate were observed (FIGS. 13(a) and 13(b), and FIGS. 14(a) and 14(b)). The cured PDLC device in which the ratio between MOA 65 and E7 was set to 40%:60% with the UV curing intensity of 16% (580 μW/cm²) was used. In the optical microscopic photographs in FIGS. 13(a) and 13(b), a slight difference was found, but it was difficult to observe since the size of the liquid crystal droplet was a micron level. As illustrated in the SEM photographs with high resolution in FIGS. 14(a) and 14(b), the PDLC device had a honeycomb-shape and was divided into holes and walls separating the holes. The hole is a position of the liquid crystal droplet and the wall is made from the pre-polymer by polymerization during the UV curing process. As illustrated in FIGS. 14(a) and 14(b), during the UV curing process, the pre-polymer and the liquid crystal mixture were decomposed into the polymer and the liquid crystal droplet by spinodal decomposition according to the external UV energy. In this case, when the number of the liquid crystal droplets increased, the size thereof decreased, and when the number of the liquid crystal droplets decreased, the size thereof increased. The main variable in difference was an increase of the temperature during the UV curing process. That is, when the temperature increased during the UV curing process, in other words, when the cooling plate was not used, the number of the liquid crystal droplets increased and the size thereof decreased. On the other hand, when the cooling plate was used, an increase of the temperate during the UV curing process was suppressed, the temperature decreased, and as a result, the number of the liquid crystal droplets decreased and the size of the droplets increased.

In the measurement results in FIGS. 13(a) and 13(b), the size of the liquid crystal droplet was 6.01 μm with the cooling plate and was 5.67 μm without the cooling plate. When the cooling plate was used, the size of the liquid crystal droplet was about 6.1% bigger than when the cooling plate was not used. Due to a difference in size, the driving voltage had a difference of 10.26% and the rising response time of the device was reduced by 7.58%.

3. A Structure of the Cooling Plate and an Embodiment Thereof

As illustrated in FIG. 15, the cooling plate was bonded with a rectangular cube made of a thin copper plate and included a water inlet at the top and a water drainage at the bottom of the side surface. A hose was connected to the water inlet and the water drainage, an underwater motor was connected to the hose in the water inlet, and ends of the hoses of the underwater motor and the water drainage were soaked in a water tank, thereby operating the cooling plate.

Figure 16:
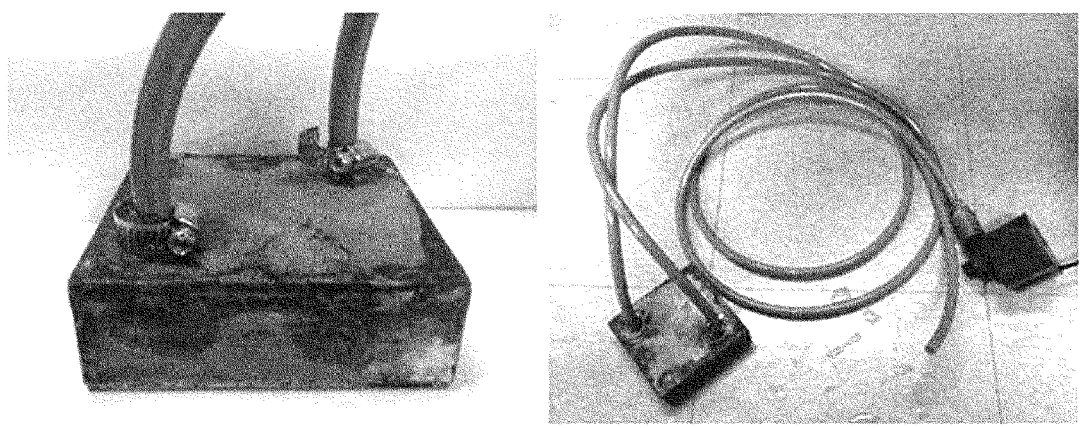
FIG. 16 shows an embodiment of the cooling plate.

FIG. 16 shows photographs of the actually manufactured cooling plate by employing the structure in FIG. 15. A left-side photograph is the cooling plate with the hose, in which the PDLC device is positioned thereon before the UV light is radiated on this cooling plate, and then the UV light is radiated so as to induce the polymer curing and the phase separation from the liquid crystal. A right-side photograph is an overall appearance of the cooling plate, in which the water pump connected to the end thereof allows the water to continuously circulate inside the cooling plate, thereby effectively removing the heat generated by the UV.

In addition, when the cooling plate is used, it is possible to easily adjust the temperature of the PDLC device during the UV curing process by adjusting the temperature of the water.

What is claimed is:

1. A method of producing a polymer dispersed liquid crystal device, comprising:
   (a) forming a gap by bonding two to seven substrates with a spacer absorbed therebetween using a UV adhesive;
   (b) injecting a liquid crystal mixture in which a pre-polymer and liquid crystal are mixed into the gap; and
   (c) curing with UV light and cooling with a cooling plate to remove heat generated by the UV light in a UV irradiation process, such that a driving voltage of the polymer dispersed liquid crystal device is reduced;
   wherein a UV intensity during the UV curing is 80 to 780 $\mu W/cm^2$ and a temperature in the UV irradiation process is constantly maintained in the range of 5 to 25° C. during the use of the cooling plate.

2. The method of claim 1, wherein the substrate is an indium-tin oxide deposited glass, polycarbonate, polyethylene terephthalate, polyethylenesulfone, polyimide, a polycyclic olefin, polyalylate, polyethylene naphthalate or polyether ether ketone.

3. The method of claim 1, wherein a material of the spacer is poly(methyl methacrylate) (PMMA).

4. The method of claim 1, wherein the pre-polymer is an acrylate-based, thiolene-based, or epoxy-based pre-polymer.

5. The method of claim 1, wherein the liquid crystal is E7.

6. The method of claim 1, wherein a mass ratio between the pre-polymer and liquid crystal ranges from 50:50 to 20:80.

* * * * *